(12) United States Patent
Ballagh et al.

(10) Patent No.: US 7,346,481 B1
(45) Date of Patent: Mar. 18, 2008

(54) HARDWARE CO-SIMULATION BREAKPOINTS IN A HIGH-LEVEL MODELING SYSTEM

(75) Inventors: Jonathan B. Ballagh, Longmont, CO (US); Roger B. Milne, Boulder, CO (US); Nabeel Shirazi, San Jose, CA (US); Jeffrey D. Stroomer, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 602 days.

(21) Appl. No.: 10/930,619

(22) Filed: Aug. 31, 2004

(51) Int. Cl.
*G06F 17/50* (2006.01)
(52) U.S. Cl. .......................................... 703/14; 703/19
(58) Field of Classification Search ................. 703/14, 703/19; 714/34
See application file for complete search history.

(56) References Cited

U.S. PATENT DOCUMENTS

| | | | | |
|---|---|---|---|---|
| 5,771,370 A | * | 6/1998 | Klein ........................... | 703/13 |
| 6,009,256 A | * | 12/1999 | Tseng et al. ................... | 703/13 |
| 6,247,147 B1 | | 6/2001 | Beenstra et al. | |
| 6,598,178 B1 | * | 7/2003 | Yee et al. ....................... | 714/34 |
| 6,802,026 B1 | * | 10/2004 | Patterson et al. ............. | 714/35 |
| 6,842,728 B2 | * | 1/2005 | Gooding et al. .............. | 703/23 |
| 6,922,821 B1 | * | 7/2005 | Nemecek ....................... | 716/4 |
| 2004/0181385 A1 | * | 9/2004 | Milne et al. ................... | 703/14 |
| 2004/0260528 A1 | * | 12/2004 | Ballagh et al. ................ | 703/14 |

OTHER PUBLICATIONS

U.S. Appl. No. 09/858,809, filed May 15, 2001, Patterson et al.
U.S. Appl. No. 10/370,023, filed Feb. 18, 2003, Shirazi.
U.S. Appl. No. 10/850,178, filed May 20, 2004, Ballagh et al.

* cited by examiner

*Primary Examiner*—Paul Rodriguez
*Assistant Examiner*—Eunhee Kim
(74) *Attorney, Agent, or Firm*—LeRoy D. Maunu; Kim Kanzaki

(57) ABSTRACT

Various approaches for controlling simulation of an electronic system are disclosed. In one approach, at least one breakpoint block is instantiated in a high-level design. The breakpoint block has an associated breakpoint condition driven by at least one signal of the design, and the design further includes at least one simulation block and at least one co-simulation block. The simulation block is simulated on a software-based simulation platform, and the co-simulation block and the breakpoint block are co-simulated on a hardware-based co-simulation platform. Advancement of a clock signal to the co-simulation block on the hardware-based co-simulation platform is inhibited in response to satisfaction of the breakpoint condition. After inhibiting the clock signal, advancement of steps of the clock signal is controlled on the co-simulation platform in one of a plurality of user-selectable clock advancement modes.

20 Claims, 5 Drawing Sheets

HARDWARE CO-SIMULATION BREAKPOINTS IN A HIGH-LEVEL MODELING SYSTEM

FIELD OF THE INVENTION

The present invention generally relates to breakpoints in co-simulation.

BACKGROUND

A high level modeling system (HLMS) is a software tool in which electronic designs can be described, simulated, and translated by machine into a design realization. An HLMS provides a higher level of abstraction for describing an electronic circuit than a hardware description language (HDL) simulation environment such as the ModelSim environment from the Model Technology company. An HLMS generally provides a mathematical representation of signals as compared to standard logic vectors in a hardware description language (HDL). The Xilinx System Generator tool for DSP and the MathWorks' Simulink and MATLAB environments are example HLMS's.

An HLMS such as System Generator also has the capability to co-simulate a design. Co-simulation generally refers to dividing a design into portions and simulating the portions on two or more platforms. There are different types of platforms on which designs can be co-simulated.

Example co-simulation platforms include both software-based and hardware-based systems. The Modelsim simulator and the NC-SIM simulator from Cadence are example software-based systems, and the Wildcard development platform from Annapolis Microsystems and the Benone development platform from Nallatech are example hardware-based systems. The WildCard and Benone platforms are often used for algorithm exploration and design prototyping.

In a hardware-based system, a portion of the design is emulated on a hardware platform that includes a programmable logic device (PLD), such as a field programmable gate array (FPGA). Co-simulating on a hardware platform may be used to reduce the time required for a simulation run. Co-simulation on a hardware platform may provide limited visibility for the co-simulated portion of the design.

In preparing a design for co-simulation in an HLMS, a designer may face issues of synchronizing the HLMS with a hardware co-simulation platform and having visibility into the state of signals on the hardware platform. To synchronize the software simulation with the hardware simulation, the designer may include ports in the hardware design that can be polled by the HLMS in order to detect when the circuit has reached a particular state. Because the polling is performed asynchronously relative to the hardware, the hardware co-simulation portion of the design is configured to remove sensitivities to timing issues resulting from communication between the software and hardware.

To provide visibility into the state of signals on the hardware platform, a designer may include tracing circuitry in the hardware co-simulation portion of the design. For example, memory blocks may be included to buffer captured data. The issues of synchronization and visibility may unnecessarily complicate the designer's work.

The present invention may address one or more of the above issues.

SUMMARY OF THE INVENTION

The various embodiments of the invention control simulation of an electronic system using various approaches. In one approach, at least one breakpoint block is instantiated in a high-level design. The breakpoint block has an associated breakpoint condition driven by at least one signal of the design, and the design further includes at least one simulation block and at least one co-simulation block. The simulation block is simulated on a software-based simulation platform, and the co-simulation block and the breakpoint block are co-simulated on a hardware-based co-simulation platform. Advancement of a clock signal to the co-simulation block on the hardware-based co-simulation platform is inhibited in response to satisfaction of the breakpoint condition. After inhibiting the clock signal, advancement of steps of the clock signal is controlled on the co-simulation platform in one of a plurality of user-selectable clock advancement modes.

In another embodiment, a system is provided for simulating an electronic system. The system includes a high-level modeling system (HLMS), and the HLMS is configured to instantiate in a design of the electronic system in response to user input, at least one block for simulation in the HLMS and at least one block for co-simulation, and instantiate at least one breakpoint block in the design in response to user input. The breakpoint block has an associated breakpoint condition driven by at least one signal of the design. The HLMS is further configured to compile the design into a simulation model for simulation on the HLMS and a configuration bitstream that implements the at least one block for co-simulation and the at least one breakpoint block. The simulation model can be simulated by the HLMS. A co-simulation engine is coupled to the HLMS and includes a programmable logic device (PLD). The co-simulation engine is configured to configure the PLD with the configuration bitstream resulting in a co-simulation circuit. The co-simulation engine further co-simulates the at least one block for co-simulation as implemented by the configuration bitstream. The co-simulation circuit is configured to inhibit advancement of a clock signal to the co-simulation circuit in response to satisfaction of the breakpoint condition.

In yet another embodiment, an apparatus controls simulation of an electronic system. The apparatus includes: means for instantiating at least one breakpoint block in a high-level design, wherein the breakpoint block has an associated breakpoint condition driven by at least one signal of the design, and the design further includes at least one simulation block and at least one co-simulation block; means for simulating the at least one simulation block on a software-based simulation platform; means for co-simulating the at least one co-simulation block and at least one breakpoint block on a hardware-based co-simulation platform; means for inhibiting advancement of a clock signal to the co-simulation block on the hardware-based co-simulation platform in response to satisfaction of the breakpoint condition; and means, responsive to inhibiting the clock signal, for controlling advancement of steps of the clock signal on the co-simulation platform in one of a plurality of user-selectable clock advancement modes.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
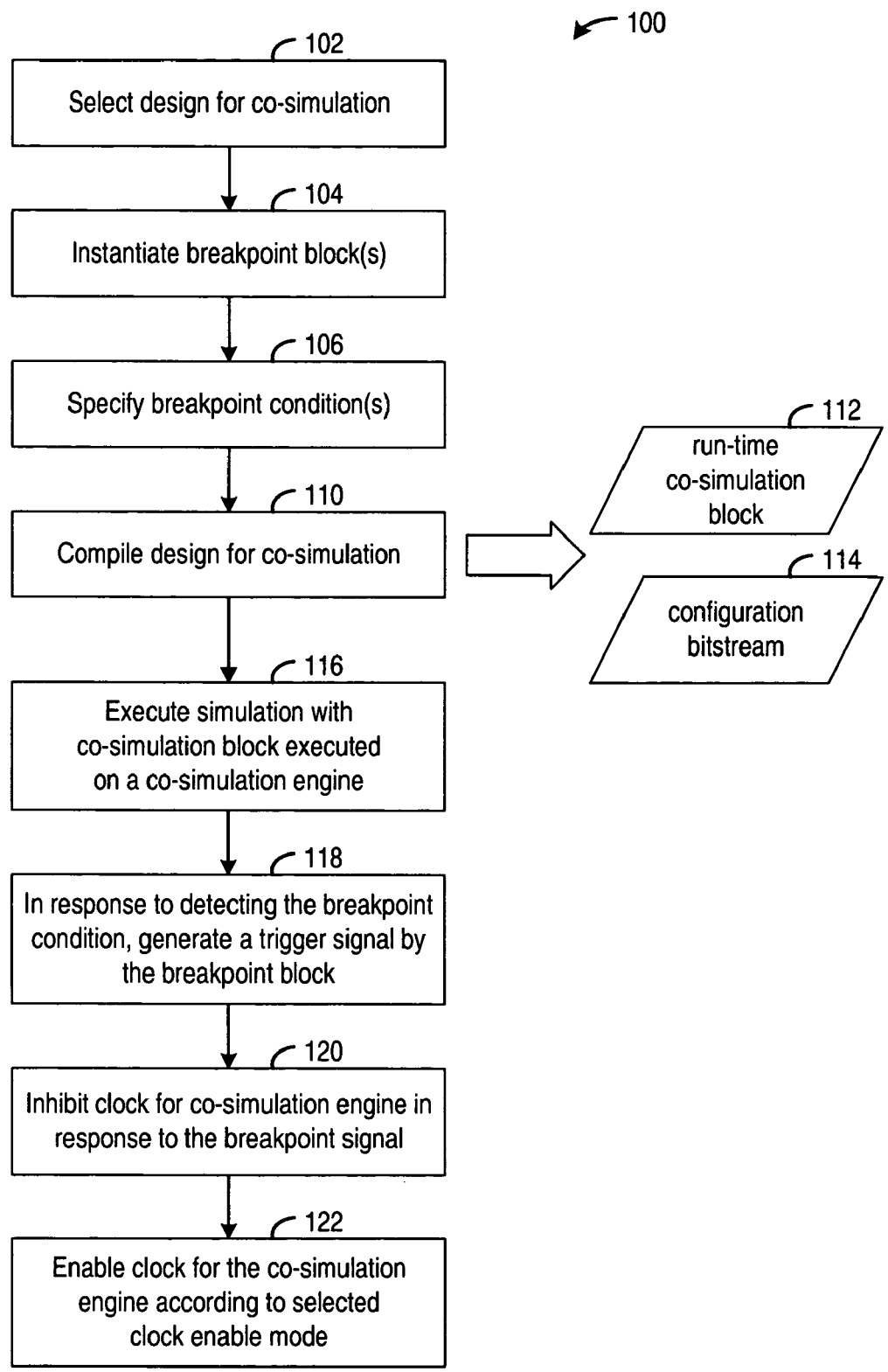
FIG. 1 is a flow diagram of a process for controlling co-simulation of a design for an electronic system in accordance with various embodiments of the invention.

FIG. 1 is a flow diagram of a process 100 for controlling co-simulation of a design for an electronic system in accordance with various embodiments of the invention. The process generally entails establishing breakpoint blocks in a high-level design, compiling the design for co-simulation, co-simulating the design on a co-simulation engine, stopping advancement of the clock on the co-simulation engine in response to a detected breakpoint condition on the co-simulation engine, and after detecting the breakpoint condition advancing the clock signal on the co-simulation engine according to a specified one of multiple clock advancement modes.

At step 102 a design of a system or subsystem that is to be co-simulated is selected. The design may be selected via the user interface of an HLMS such as System Generator. Via the HLMS, a user may insert one or more breakpoint blocks into the HLMS design (step 104). Each breakpoint block is driven with one or more user-selected signals from the design, and a user-specified logical relationship between the signals is the breakpoint condition (step 106). When a breakpoint condition is detected during co-simulation, the clock signal to the co-simulated logic on the co-simulation engine is interrupted. In one embodiment, the breakpoint blocks are also HLMS blocks, producing and consuming the same types of signals as other HLMS blocks.

Once the breakpoint blocks have been established in the design, the user may direct the HLMS to compile the design for hardware co-simulation (step 110). The results of the compilation include a co-simulation block 112 and a configuration bitstream 114. The configuration bitstream implements logic of one or more parts of the high-level design to be co-simulated on a PLD-based co-simulation engine, interface logic for co-simulation, and logic of the breakpoint blocks.

Once compiled, the design can be simulated with a portion of the design being co-simulated on a hardware platform (step 116). When a breakpoint condition is detected on the co-simulation engine by the circuitry that implements a breakpoint block, a trigger signal is generated to control advancement of the clock signal on the co-simulation engine (step 118). Advancement of the clock is initially inhibited when the breakpoint condition is detected (step 120). For software-based simulation taking place in an HLMS, detection of the breakpoint condition also interrupts advancement of software-based simulation.

After initially inhibiting advancement of the clock signal, the clock signal may be advanced according to a user-specified clock advancement mode (step 122). The various embodiments of the invention provide different user-selectable clock advancement modes that may be used in controlling advancement of the clock signal when a breakpoint condition is detected. The different modes include single step, free running, and multi-step clock advancement modes.

In the single step clock advancement mode the simulation is advanced by a single clock cycle, upon initiation by the user, and then paused. The user is required to again advance the clock cycle after the clock signal is paused.

In the free running clock advancement mode, once the user initiates clock advancement after the pause the simulation clock is allowed to run until another breakpoint condition is detected.

The multi-step clock advancement mode allows the user to specify a certain number of clock cycles by which the clock signal is advanced. In one embodiment, a pulse generator is used to produce the selected number of free-running clock cycles, and after that number of clock cycles, the simulation is again paused.

The specification by the user of the clock advancement mode by which the clock is enabled (step 122) may be accomplished with various different approaches. In one embodiment, upon detection of the breakpoint condition the user may be prompted to select one of the available modes. In another embodiment, the clock advancement mode for a breakpoint may be specified by the user via a user-interface window at the time the breakpoint block is instantiated.

Figure 2A:
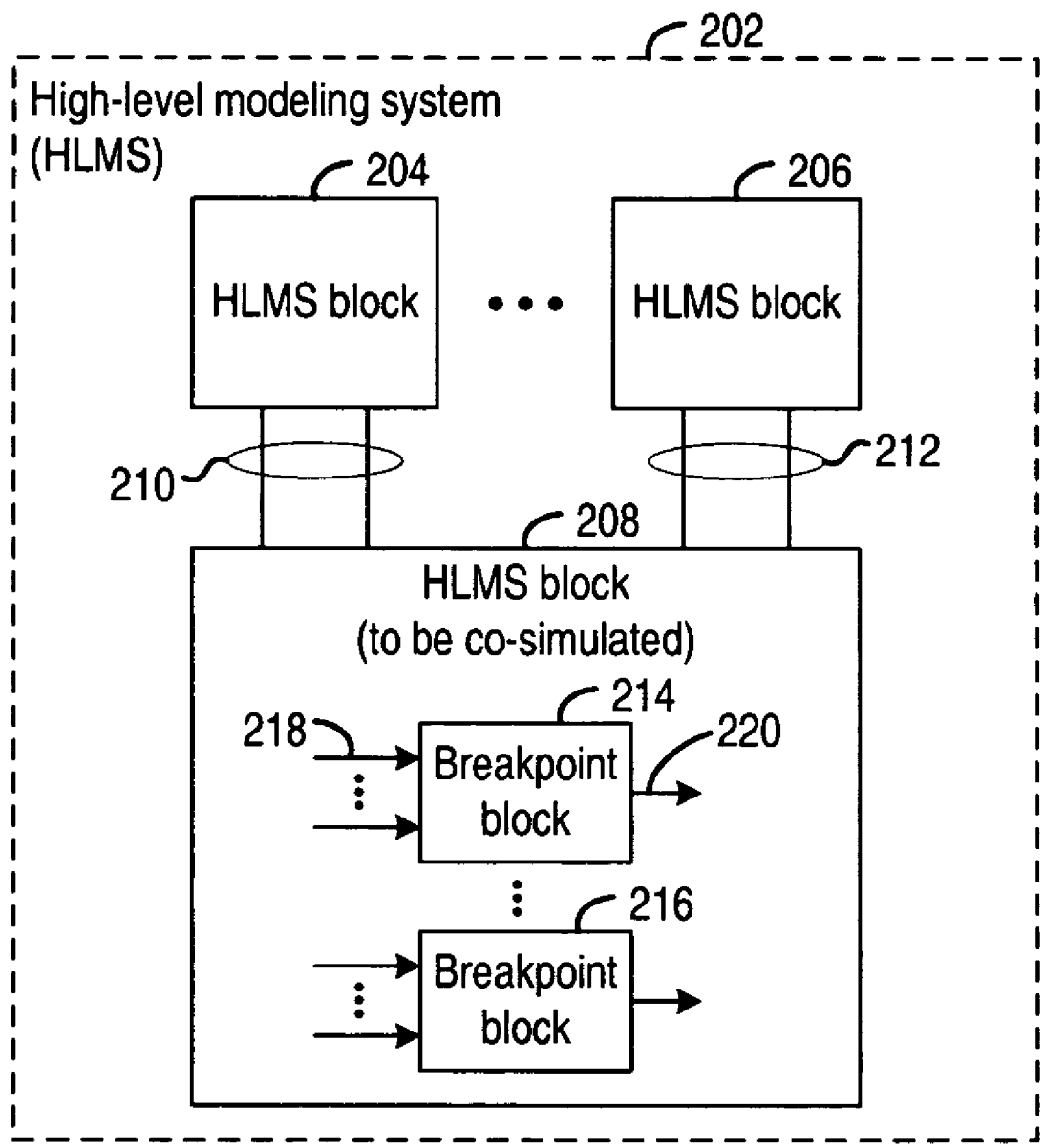
FIG. 2A is a block diagram showing a design represented as blocks, including multiple breakpoint blocks, in a high-level modeling system (HLMS)

FIG. 2A is a block diagram showing a design represented as blocks, including multiple breakpoint blocks, in a high-level modeling system (HLMS) 202. The design includes HLMS blocks 204, 206, and 208, with block 208 being the block designated by the user for co-simulation. The HLMS blocks 204 and 206 represent and specify parts of the design to be simulated in the HLMS (software-based simulation). The block 208 represents a part of the design to be co-simulated on a hardware-based co-simulation engine. Signals passed between HLMS block 204 and block 208 are represented as lines 210, and signals passed between HLMS block 206 and block 208 are represented as lines 212.

One or more breakpoint blocks 214 and 216 may be instantiated in the design. Each breakpoint block is driven by at least one signal in the design, and in response to detecting a breakpoint condition the breakpoint block generates a trigger signal that pauses the co-simulation. For example, breakpoint block 214 inputs a signal (line 218) which is used in detecting a breakpoint condition. The trigger signal from breakpoint block 214 is shown as line 220.

In one embodiment, the breakpoint block may be specified as an HLMS block that is instantiated in the design. The user may define the breakpoint condition for the breakpoint block with a relational expression that is specified in terms of port names. The port names used in this expression become physical input ports on the blocks. The user drives these ports by HLMS signals that are used elsewhere in the design. The task of defining the breakpoint condition for the block is referred to as "parameterizing" the block. It will be appreciated that values for parameters other than a breakpoint condition may be associated with a block depending on the block's functionality.

In another embodiment, the breakpoint HLMS block may be implemented with a single input port that accepts a Boolean control signal (i.e., a value of true or false). When the value is true the breakpoint condition is reached. In this case, the relational logic that defines the breakpoint condition is specified outside of the breakpoint block by using additional HLMS blocks. This provides more flexibility in specifying the breakpoint condition than does a purely relational expression. In another embodiment, the breakpoint block may be defined by calling a function in a programming language such as MATLAB .m code.

Figure 2B:
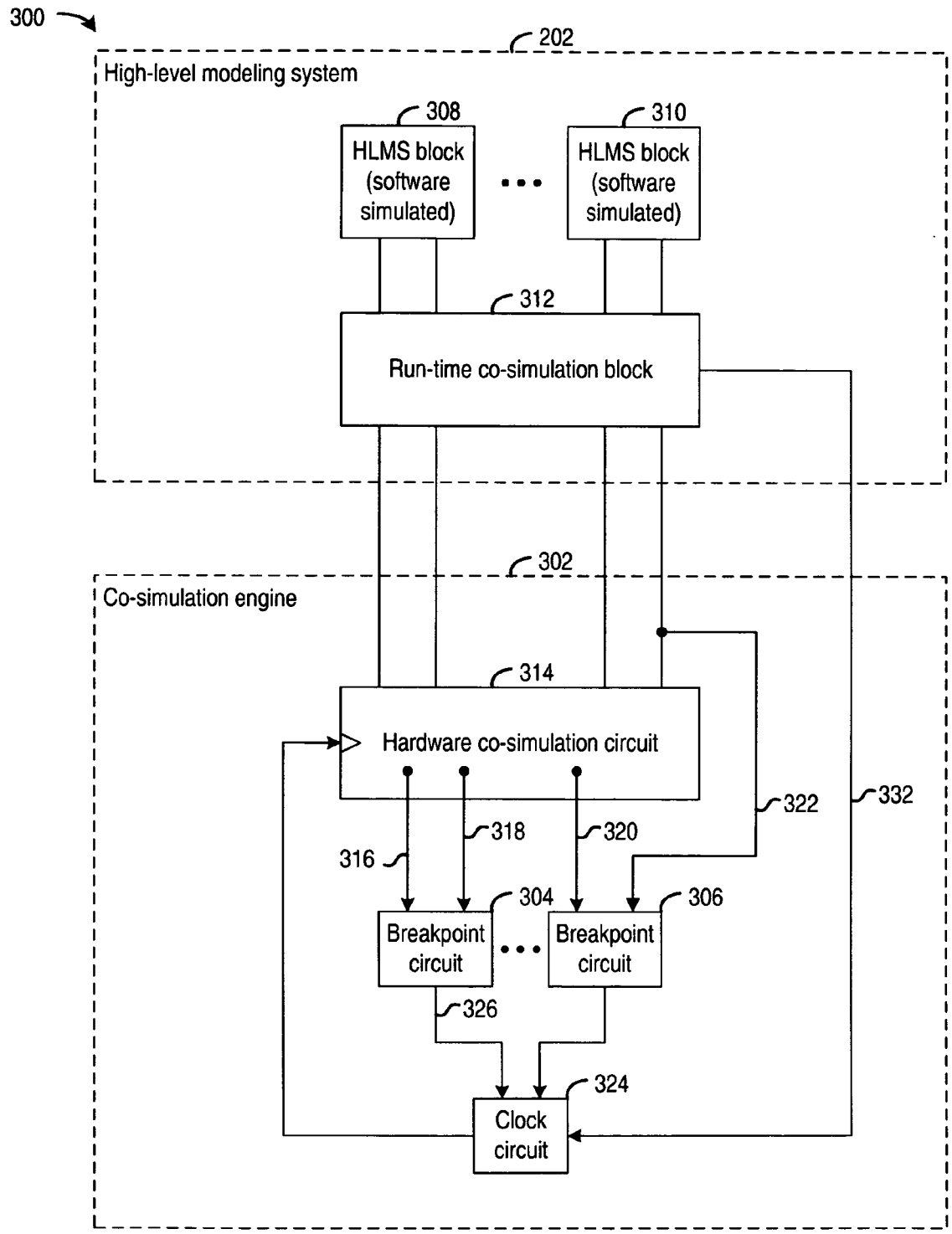
FIG. 2B is a block diagram of a co-simulation arrangement in which part of the design is simulated in an HLMS, another part of the design is co-simulated in a hardware-based co-simulation engine, and breakpoint circuits are used in the co-simulation in accordance with various embodiments of the invention.

FIG. 2B is a block diagram of a co-simulation arrangement in which part of the design is simulated in an HLMS 202, another part of the design is co-simulated in a hardware-based co-simulation engine 302, and breakpoint circuits 304 and 306 are used in the co-simulation in accordance with various embodiments of the invention. The HLMS blocks 308 and 310 correspond to the blocks 204 and 206 in the design view of FIG. 2A, and the run-time co-simulation block 312 corresponds to the co-simulation block 208 in FIG. 2A.

In compiling the co-simulation block 208 of FIG. 2A, the run-time co-simulation block 312 and a hardware realization (e.g., a configuration bitstream) of the logic of the co-simulation block 208 are generated. The run-time co-simulation block 312 encapsulates for the HLMS 202 the portion of the design that is co-simulated in hardware. From a user's perspective, the run-time co-simulation block is used in a manner similar to other HLMS blocks in the design. The run-time co-simulation block provides an interface through which the component in the design can communicate with the realization 314 of the block. Various approaches for creating a run-time co-simulation block are described in the patent application entitled, "EMBEDDING A CO-SIMULATED HARDWARE OBJECT IN AN EVENT-DRIVEN SIMULATOR", having application Ser. No. 10/850,178 which was filed on May 20, 2004 by Ballagh et al., the contents of which are incorporated by reference.

The hardware co-simulation circuit 314 is the realization of the co-simulation block 208 in the hardware of co-simulation engine 302. In a co-simulation engine that is built with a PLD, the configuration bitstream that is generated from compilation of the design is used to configure the PLD. The configuration bitstream further configures the PLD to implement the breakpoint circuits 304 and 306. The breakpoint circuits are driven by signals of the hardware co-simulation circuit as shown by lines 316, 318, and 320. Breakpoint circuit 306 is also driven by a signal from the software-based simulator of the HLMS as shown by line 322.

Each breakpoint circuit implements an associated breakpoint condition, and the breakpoint condition is defined relative to the input signals of the breakpoint circuit. For example, the breakpoint condition implemented by breakpoint circuit 304 is a function of the signals on lines 316 and 318. It will be appreciated that the definition of each breakpoint condition depends on design and user requirements.

When a breakpoint condition is satisfied (e.g., the logic expression evaluates to true), a trigger signal is activated to the clock circuit 324. The trigger signal from breakpoint circuit 304 to the clock circuit 324 is on line 326, for example.

The clock circuit 324 drives a clock signal to the co-simulation circuit 314 and is responsive to input signals from the breakpoint circuits 304 and 306. In one embodiment, the clock circuit may halt advancing the clock signal to the hardware co-simulation circuit 314 in response to activation of a trigger signal from a breakpoint circuit. Further control of the clock circuit 324 may be provided by the HLMS through the run-time co-simulation block 312 (line 332).

Further description of various approaches for controlling clocking during co-simulation is found in the application Ser. No. 10/370,023 entitled, "METHOD AND APPARATUS FOR HARDWARE CO-SIMULATION CLOCKING", which was filed on Feb. 18, 2003 by Nabeel Shirazi, the contents of which are incorporated by reference.

Figure 3:
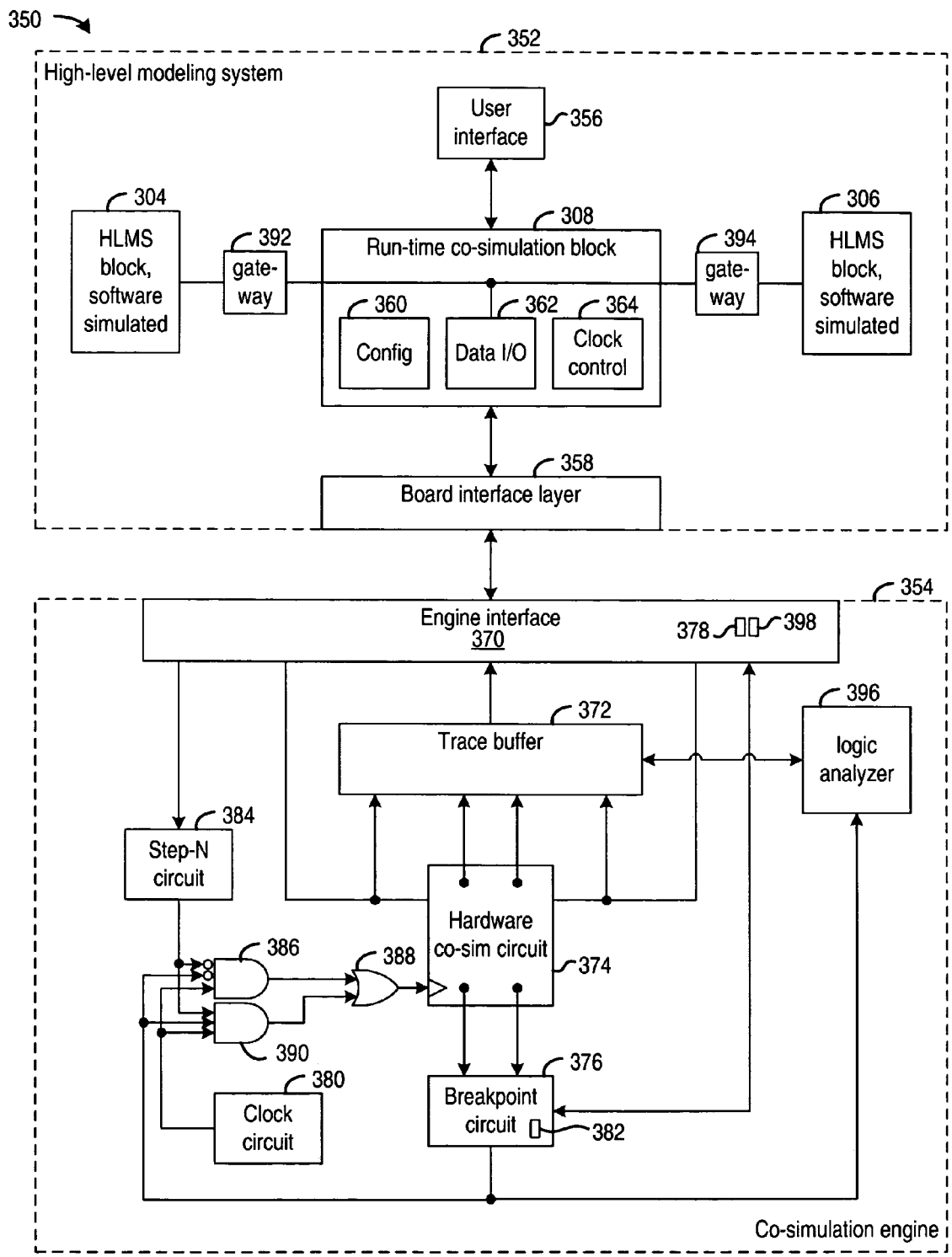
FIG. 3 is a block diagram of a co-simulation arrangement in accordance with further embodiments of the invention.

FIG. 3 is a block diagram of a co-simulation arrangement 350 in accordance with further embodiments of the invention. The co-simulation arrangement includes an HLMS 352 and a co-simulation engine 354, with the HLMS further including a user interface 356, a board interface layer 358, and control blocks 360, 362, and 364. The co-simulation engine 354 further includes interface 370, assorted circuitry for controlling the clock signal that is applied to the hardware co-simulation circuit 374, and a trace buffer 372.

The user interface 356 is provided by the HLMS and allows the user to control the simulation and co-simulation. In addition to the basic functions of starting and stopping the simulation, the HLMS provides by way of the user interface an approach for a user to select a clock advancement mode after a breakpoint is reached.

The breakpoint circuit 376 signals when the breakpoint condition is detected, for example, by setting bit 378 in the engine interface 370. Before the HLMS reads/writes to a port in the engine interface, it first polls the status bit 378 to determine whether the co-simulation has been halted. If the simulation is halted, the HLMS pauses the software-based simulation, and presents the user with a GUI window, for example, which prompts the user to select a clock advancement mode.

The control blocks 360, 362, and 364 provide various controls over the co-simulation engine. The configuration control block 360 provides functions such as opening (e.g., configuring programmable logic of the co-simulation engine with the configuration bitstream) and closing the co-simulation engine 354 (e.g., saving any state information and stopping the co-simulation). The data I/O control block 362 handles the transfer of data between components simulated in the HLMS, for example, HLMS blocks 304 and 306, and the co-simulated hardware co-simulation circuit 374. The clock control block 364 monitors the breakpoint bit 378 and communicates with user interface 356 when a breakpoint is reached. In response to directives from the user interface 356, the clock control 364 controls the mode by which the clock signal to the hardware co-simulation circuit is advanced.

In one embodiment, the board interface layer 358 includes a set of program-callable functions that are available to the run-time co-simulation block. The program callable functions support configuring the co-simulation engine, and reading data from and writing data to the engine interface 370 of the co-simulation engine. In a PLD-based co-simulation engine, the engine interface 370 may be implemented as a memory map on the PLD. Elements in the memory map correspond to I/O ports of the run-time co-simulation block.

Clock circuit 380 generally provides the clock signal for the hardware co-simulation circuit 374. The clock signal may be interrupted and selectively advanced, however, when a breakpoint condition is signaled by the breakpoint circuit 376. When the breakpoint circuit detects the breakpoint condition, bit 382 is set to indicate that a breakpoint condition was detected. The bit may be cleared under user control to resume a free-running clock.

The step-N circuit 384 is configurable by the user (via user interface 356) to advance the clock signal by the specified number of steps. Before the breakpoint condition is detected, output signals from both the step-N circuit 384 and bit 382 are inactive, and the signal from the clock circuit 380 is active. Thus, the free-running clock signal from the clock circuit 380 clocks the hardware co-simulation circuit 374 (by way of gates 386 and 388) until the breakpoint is detected. Once the breakpoint is detected, the bit 382 is set and the clock is not advanced until the step-N circuit 384 asserts its output signal and the clock signal from clock circuit 380 is asserted (gate 390).

It will be appreciated that the clock signal to different selected parts of the hardware co-simulation circuit may be enabled or disabled in combination with the breakpoint condition in accordance with the teachings of application Ser. No. 09/858,809 entitled, "PARAMETERIZABLE AND RECONFIGURABLE DEBUGGER CORE GENERATORS", which was filed on May 15, 2001 by Patterson et al., the contents of which are incorporated herein by reference.

The trace buffer 372 may be used as a signal tracer. A user-definable number of samples may be saved in the buffer using a FIFO scheme. The sample values may come from signals internal to the hardware co-simulation circuit 374 or from input to or output from the hardware co-simulation circuit. The user interface 356 may further provide an interface to read data from the trace buffer 372 when a breakpoint condition is detected.

In one embodiment, the trace buffer 372 may be implemented with gateway blocks 392 and 394. A gateway in block (392) converts a double precision signal into a signal compatible with the run-time co-simulation block 308, and the gateway out (394) converts output data from the co-simulation block 308 into double precision for the HLMS simulator (e.g., Simulink). When an HLMS design is compiled into hardware, the gateway blocks are translated into top-level ports on the corresponding design component. Moreover, the gateway blocks are translated into ports on the run-time co-simulation block. The hardware realization of the gateway blocks is the trace buffer 372.

The gateway blocks 392 and 394 may be parameterized with values to: enable/disable trace logic insertion (in the hardware co-simulation realization) for that particular port; and specify the buffer depth of the trace logic that corresponds to that particular port. In an example embodiment, a logic analyzer 396 controls the signal tracing on the co-simulation engine. The configuration data to implement the logic analyzer 396 is generated when the design is compiled for simulation and co-simulation. A particular example of a logic analyzer is the Xilinx ChipScope Pro Analyzer tool.

Status bit 398 may be set by a user to disable the breakpoint circuit 376. Disabling the breakpoint circuit has the effect that the presence of the breakpoint condition does not pause the co-simulation.

Figure 4:
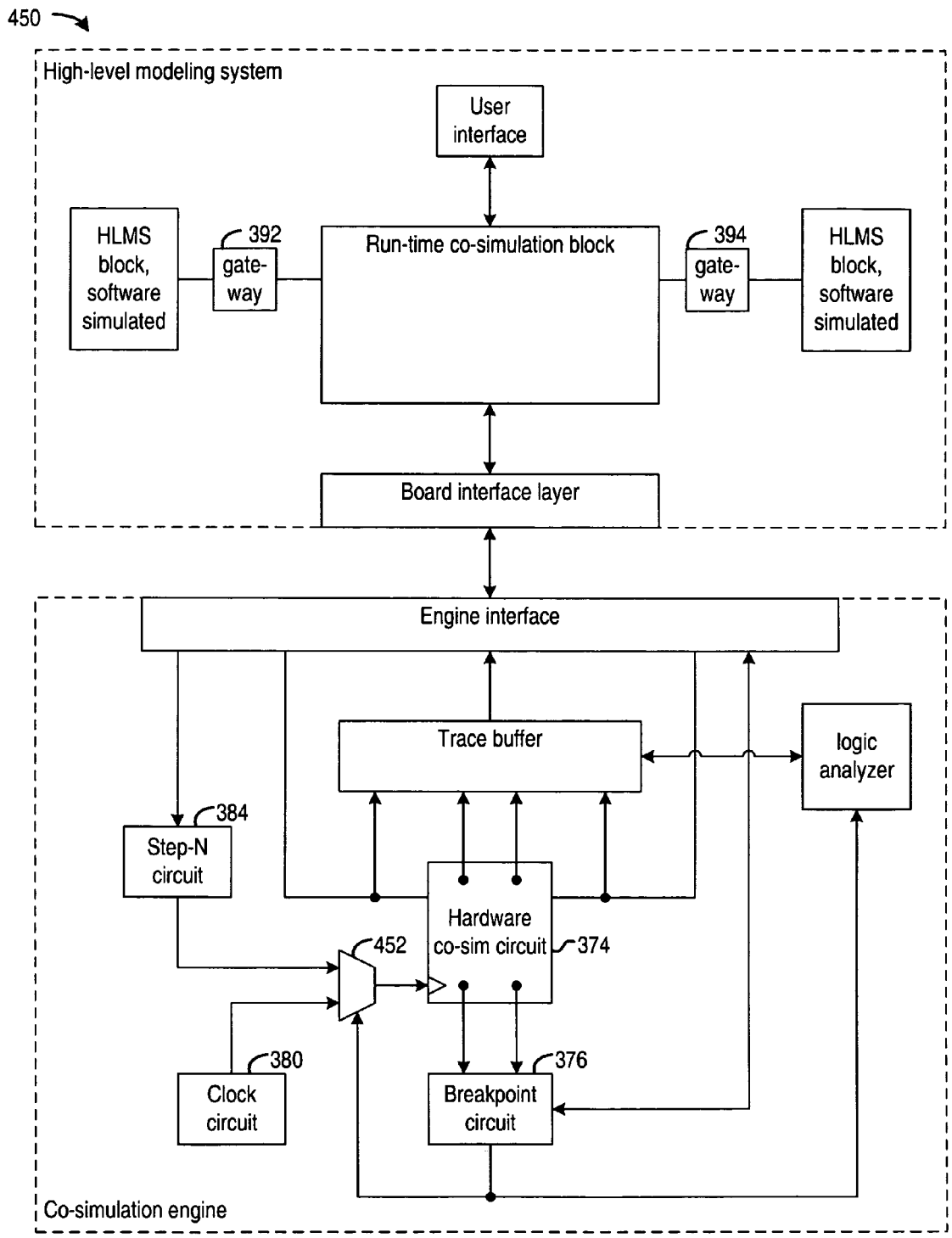
FIG. 4 is a block diagram of a co-simulation arrangement in accordance with further embodiments of the invention in which the clock signal is selected from either the clock circuit or the step-N circuit.

FIG. 4 is a block diagram of a co-simulation arrangement 450 in accordance with further embodiments of the invention in which the clock signal is selected from either the clock circuit or the step-N circuit. With the exceptions explained below, the major components shown in FIG. 4 correspond to the components shown in FIG. 3 and described above. The further embodiments involve selecting between the free-running clock signal and a stepped clock signal.

In a particular embodiment, a multiplexer 452 in the PLD may be used to select the signal for clocking the hardware co-simulation circuit 374. For example, in Virtex FPGAs from Xilinx, the BUFGMUX multiplexer may be used for this function. The state of the trigger signal from the breakpoint circuit 376 may be used to select between the clock signal from the clock circuit 380 and the pulse from the step-N circuit 384.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for co-simulating designs for electronic systems and has been found to be particularly applicable and beneficial in controlling clocking during co-simulation. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for controlling simulation of an electronic system, comprising:

instantiating at least one breakpoint block in a high-level design, wherein the breakpoint block has an associated breakpoint condition driven by at least one signal of the design, and the design further includes at least one simulation block and at least one co-simulation block;

simulating the at least one simulation block on a software-based simulation platform;

co-simulating the at least one co-simulation block and at least one breakpoint block on a hardware-based co-simulation platform;

inhibiting advancement of a clock signal to the co-simulation block on the hardware-based co-simulation platform in response to satisfaction of the breakpoint condition; and after inhibiting the clock signal, controlling advancement of steps of the clock signal on the co-simulation platform in one of a plurality of user-selectable clock advancement modes, wherein the controlling advancement of steps of the clock signal includes providing a number of cycles of the clock signal on the co-simulation platform in response to the one advancement mode, wherein each advancement mode is for providing a different number of cycles of the clock signal.

2. The method of claim 1, further comprising prompting a user to select one of the plurality of clock advancement modes in response to the inhibiting of the clock signal.

3. The method of claim 1, wherein the plurality of clock advancement modes includes a single step clock advancement mode, and the controlling advancement of steps of the clock signal includes:

advancing the clock signal by a single cycle in response to a user input control; and inhibiting the clock signal after advancement by the single cycle.

4. The method of claim 3, wherein the plurality of clock advancement modes includes an n-step clock advancement mode, wherein n is user configurable, and the controlling advancement of steps of the clock signal includes:

advancing the clock signal by a n cycles in response to a user input control; and inhibiting the clock signal after advancement by the n cycles.

5. The method of claim 4, wherein the plurality of clock advancement modes includes a free-running clock advancement mode, and the controlling advancement of steps of the clock signal include resuming advancement of the clock signal to the co-simulation block in a free-running mode in response to a user input control.

6. The method of claim 5, further comprising accumulating states of signals in a trace buffer on the hardware-based co-simulation platform.

7. The method of claim 1, wherein the instantiating of the at least one breakpoint block includes associating a parameter value indicating one of the plurality of clock advancement modes in response to user specification of the parameter value.

8. The method of claim 1, wherein the instantiating of the at least one breakpoint block includes specifying the breakpoint condition in a high-level modeling language.

9. The method of claim 1, wherein the inhibiting step includes:
   selecting between a step signal and the clock signal in response to the clock advancement mode; and applying a selected one of the step signal and the clock signal to a clock port of the co-simulation block co-simulated on the hardware-based co-simulation platform.

10. The method of claim 1, further comprising signaling the software-based simulation platform in response to satisfaction of a breakpoint condition.

11. A system for simulating an electronic system, comprising:
   a high-level modeling system (HLMS), the HLMS configured to,
      instantiate in a design of the electronic system in response to user input, at least one block for simulation in the HLMS and at least one block for co-simulation;
      instantiate at least one breakpoint block in the design in response to user input, wherein the breakpoint block has an associated breakpoint condition driven by at least one signal of the design;
      compile the design into a simulation model for simulation on the HLMS and a configuration bitstream that implements the at least one block for co-simulation and the at least one breakpoint block; and
      simulate the simulation model;
   a co-simulation engine coupled to the HLMS, the co-simulation engine including a programmable logic device (PLD) and configured to,
      configure the PLD with the configuration bitstream resulting in a co-simulation circuit; and
      co-simulate the at least one block for co-simulation as implemented by the configuration bitstream, wherein the co-simulation circuit is configured to inhibit advancement of a clock signal to the co-simulation circuit in response to satisfaction of the breakpoint condition.

12. The system of claim 11, wherein the co-simulation circuit is further configured to, after inhibiting the clock signal, control advancement of steps of the clock signal to the co-simulation circuit in one of a plurality of user-selectable clock advancement modes; and
   wherein the controlling advancement of steps of the clock signal includes providing a number of cycles of the clock signal on the co-simulation platform in response to the one advancement mode, wherein each advancement mode is for providing a different number of cycles of the clock signal.

13. The system of claim 12, wherein the co-simulation circuit is further configured to signal the HLMS in response satisfaction of a breakpoint condition, and the HLMS is configured to prompt a user to select one of the plurality of clock advancement modes in response to the signal from the co-simulation circuit.

14. The system of claim 12, wherein the plurality of clock advancement modes includes a single step clock advancement mode, and the co-simulation circuit is further configured to advance the clock signal by a single cycle in response to a user input control, and inhibit the clock signal after advancement by the single cycle.

15. The system of claim 14, wherein the plurality of clock advancement modes includes an n-step clock advancement mode, wherein n is user configurable, and the co-simulation circuit is further configured to advance the clock signal by n cycles in response to a user input control, and inhibit the clock signal after advancement by the n cycles.

16. The system of claim 15, wherein the plurality of clock advancement modes includes a free-running clock advancement mode, and the co-simulation circuit is further configured to resume advancement of the clock signal in a free-running mode in response to a user input control.

17. The system of claim 16, wherein the co-simulation circuit is further configured to accumulate states of signals in a trace buffer in the co-simulation circuit.

18. The system of claim 12, wherein the HLMS is further configured to associate with the at least one breakpoint block a parameter value indicating one of the plurality of clock advancement modes in response to user specification of the parameter value.

19. The system of claim 12, wherein the co-simulation circuit is further configured to select between a step signal and the clock signal in response to the clock advancement mode, and apply a selected one of the step signal and the clock signal to a clock port of the co-simulation block co-simulated on the hardware-based co-simulation platform.

20. An apparatus for controlling simulation of an electronic system, comprising:
   means for instantiating at least one breakpoint block in a high-level design, wherein the breakpoint block has an associated breakpoint condition driven by at least one signal of the design, and the design further includes at least one simulation block and at least one co-simulation block;
   means for simulating the at least one simulation block on a software-based simulation platform;
   means for co-simulating the at least one co-simulation block and at least one breakpoint block on a hardware-based co-simulation platform;
   means for inhibiting advancement of a clock signal to the co-simulation block on the hardware-based co-simulation platform in response to satisfaction of the breakpoint condition; and
   means, responsive to inhibiting the clock signal, for controlling advancement of steps of the clock signal on the co-simulation platform in one of a plurality of user-selectable clock advancement modes,
   wherein the means for controlling advancement of steps of the clock signal includes means for providing a number of cycles of the clock signal on the co-simulation platform in response to the one advancement mode, wherein each advancement mode is for providing a different number of cycles of the clock signal.

* * * * *